United States Patent [19]

Frisch, deceased et al.

[11] 3,977,939

[45] Aug. 31, 1976

[54] NUCLEAR REACTOR INTERNALS ARRANGEMENT

[75] Inventors: Erling Frisch, deceased, late of Pittsburgh, Pa. by Dorothy Randall Frisch, administratrix; Harry N. Andrews, Franklin Township, Westmoreland County, Pa.

[73] Assignee: Westinghouse Electric Corporation, Pittsburgh, Pa.

[22] Filed: Oct. 15, 1973

[21] Appl. No.: 406,454

[52] U.S. Cl. ............................................. 176/36 R
[51] Int. Cl.² ........................................ G21C 7/08
[58] Field of Search .................... 176/36, 29, 33, 35

[56] References Cited
UNITED STATES PATENTS

| | | |
|---|---|---|
| 3,607,629 | 9/1971 | Frisch et al. ..................... 176/36 R |
| 3,725,199 | 4/1973 | Notari et al. .......................... 176/35 |
| 3,814,667 | 6/1974 | Klumb et al. ......................... 176/30 |

*Primary Examiner*—Samuel Feinberg
*Attorney, Agent, or Firm*—J. R. Campbell

[57] ABSTRACT

A nuclear reactor internals arrangement is disclosed which facilitates reactor refueling. A reactor vessel and a nuclear core is utilized in conjunction with an upper core support arrangement having means for storing withdrawn control rods therein. The upper core support mounted to the underside of the reactor vessel closure head so that upon withdrawal of the control rods into the upper core support, the closure head, the upper core support and the control rods are removed as a single unit thereby directly exposing the core for purposes of refueling.

16 Claims, 8 Drawing Figures

NUCLEAR REACTOR INTERNALS ARRANGEMENT

CROSS REFERENCE TO RELATED APPLICATION

This application relates to copending application having the Ser. No. 53,207 and entitled "Means For Rapidly Exposing The Core Of A Nuclear Reactor For Refueling," filed July 8, 1970, now Pat. No. 3,836,429, by Erling Frisch et al and assigned to the present assignee.

BACKGROUND OF THE INVENTION

1. Field of the Invention

This invention pertains to nuclear reactor internals, and more particularly to an internals arrangement whereby a core is made accessible by removal of the reactor control rods and the upper core support as a single unit.

2. Description of the Prior Art

In a commercial nuclear reactor, heat, from which electricity is generated, is produced by fissioning of a fissile material, such as enriched uranium. This fissile material, or nuclear fuel, is typically contained within a core made up of a plurality of fuel elements, coextensively arranged in a spaced parallel array. Movable control rods are dispersed throughout the core to control the fission process. The control rods often comprise a plurality of elongated rods containing neutron absorbing materials, for example silver, indium and cadmium which fit in openings among the fuel elements so as to be guided thereby during movement into and out of the core. Inserting a control rod into the core adds more absorber material and hence, decreases the nuclear reaction; conversely, withdrawing a control rod removes absorber material and hence, increases the nuclear reaction and thereby, the power output. The nuclear core and the control rods are positioned within and supported by a reactor vessel.

The heat produced by the nuclear reaction is removed by flowing a reactor coolant through the nuclear core. This heat is then transferred from the reactor coolant to a fluid in another flow system where it is converted into steam which is used to drive steam turbine-electrical generator apparatus. The flow of the reactor coolant through the nuclear core produces large structural loads on the core; therefore, a core support system is provided which is typically both strong and rigid to carry these loads and to assure safety of reactor operation. The core support system, or as it is sometimes called the nulcear reactor industry, "the reactor internals" serve to: fixedly position and support the fuel assemblies comprising the nuclear core, guide and support the nuclear reactor control rods, and direct the flow of reactor coolant through the nuclear core and the reactor vessel within which the core is contained.

In the prior art, primarily because of the structural and safety functions performed by the reactor internals, the various components of the reactor internals are assembled to each other in such a way as to assure their integrity during reactor operation. Therefore, in order to disassemble the reactor internals, each component or subassembly must be individually disconnected from another component or subassembly in sequential fashion. It is obvious then that such a disassembly procedure involves a significant length of time and a significant expenditure of manpower in order to expose the nuclear core for purposes of refueling the core. Moreover, the reactor downtime resulting from the refueling operation, and therefore, the period of time when the reactor is unavailable for the production of electricity, is directly dependent upon the time required to disassemble and reassemble the reactor internals during refueling of the core.

SUMMARY OF THE INVENTION

The aforementioned problems of the prior art are overcome in the present invention by providing a reactor upper internals arrangement which supplies the requisite upper core support while allowing for quick removal of the control rods and the upper core support so as to directly expose the core for refueling.

The upper part of the core is supported by a rigid structure comprising a pair of support plates separated by a number of stiff support columns. The support columns act in a dual capacity in that they serve additionally as storage containers for withdrawn control rods. Control rod guide tubes are positioned within the support columns to provide the control rods with adequate guidance during withdrawal and sufficient support while being stored therein.

The upper core support is fixedly attached to a reactor vessel closure head. In this manner, removal of the closure head results in the removal of the upper core support and the control rods being stored therein. Thus, the core is rapidly exposed for purposes of refueling. Since reassembly involves procedures in reverse to disassembly, it follows that reassembly of the reactor is also rapidly effectuated so that overall downtime for reactor refueling is a minimum.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Throughout the description which follows, like reference characters indicate like elements in the various figures of the drawings.

Figure 1:
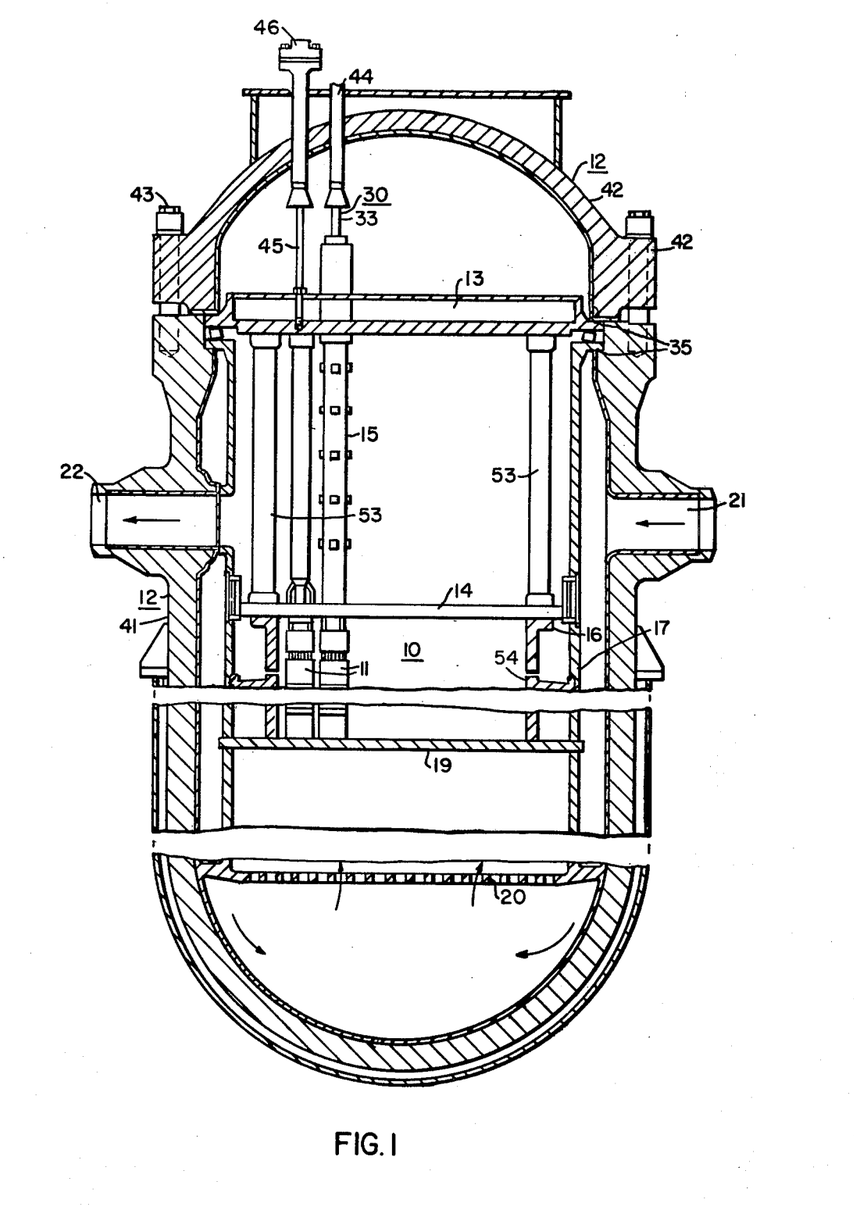
FIG. 1 is a cross sectional view of a reactor vessel including reactor internals incorporating the principles of this invention.

Referring now more particularly to FIG. 1 of the drawings, a reactor vessel including an internals arrangement for rapidly exposing the core is illustrated therein. It is to be noted, that although FIG. 1 illustrates a particular type of nuclear reactor, that is a light water moderated, thermal reactor, the invention is not to be limited thereby. The concepts embodied herein may be applied to various other types of commercial nuclear power plants with equal advantage. Referring again to FIG. 1, a nuclear core 10 comprising a plurality of fuel assemblies 11 is contained within a pressure vessel 12. A typical nuclear reactor may contain 193 or more fuel assemblies; hence, the relatively few number of fuel assemblies shown in the figure is only for the purposes of simplicity. The fuel assemblies 11 are supported by reactor internals which comprise lower internals and upper internals.

The upper internals include an upper support structure 13, an upper core plate 14, a plurality of support columns 15 and a set-down skirt 16. The lower internals include a core support barrel 17, a core baffle 54, a lower core plate 19 and a lower support structure 20. The lower internals provide bottom and lateral support while the upper, internals provide upper and lateral support to the fuel assemblies 11. Since the reactor coolant flows through the nuclear core in an upward direction, the upper internals must provide against the bulk of the reactor coolant flow loads. The upper internals and the lower internals on the other hand must both provide for flow loads induced by cross flow of the reactor coolant as it changes direction in order to enter and exit from the reactor vessel 12 by way of inlet and outlet nozzles 21 and 22 respectively.

Control of the reactor is accomplished by a plurality of control rods 30 which penetrate the reactor vessel 12 extend through openings in the upper internals and fit within the nuclear core. The core rods 30 include a plurality of control elements 32 attached to a central hub which in turn in attached to a drive shaft 33. The drive shaft 33 is the portion of the control rod 30 which penetrates the reactor vessel 12 and extends through the upper internals. The control elements 32 are normally positioned within the nuclear core in guide tubes especially provided for this purpose.

The axially upward flow forces on the fuel assemblies 11 are transmitted to the upper core plate 14, through the support columns 15 and into the upper structure 13. These loads are then transmitted to the reactor pressure vessel 12 at the location of the flange 35. Since the flow exciting from the nuclear core 10 is in an axial direction relative to the fuel assemblies 11, while the flow of the reactor coolant exciting from the pressure vessel is in a transverse direction, the reactor coolant must turn through a 90° angle upon leaving the core and prior to exiting from the reactor vessel. This change in direction of the reactor coolant adds to the flow loads imposed upon the upper internals. It is understandable then that the upper internals must possess high strength and rigidity.

As previously mentioned, another function of the upper internals is to serve as a structural guide for the control rods while in a withdrawn or partially withdrawn position relative to the core. In the illustrated embodiments, control rod guide tube assemblies 40 are housed within the support columns 15. This arrangement provides adequate protection for the control rods while efficiently utilizing the space available within the upper internals.

Still referring to FIG. 1, it is seen that the reactor vessel 12 comprises a vessel section 41 and a removal closure head 42. Stud bolts 43 secure the closure head 42 to the vessel portion 41 of the reactor vessel 12. A plurality of penetrations adaptors 44 extend through the closure head 42 and are fixedly connected thereto, such as by welding. The adaptors comprising hollow rods 44 provide a means for sealingly penetrating the reactor vessel by the control rod drive shaft 33. In the present invention, the penetration adaptors 44 also provide a means whereby the upper internals may be connected to the closure head 42. A plurality of elongated rods 45 which are threadedly connected to the upper support structure 13, extend through penetration adaptors 44 to a location above the closure head 42. The upper ends of elongated rods 45 being supported on top of the penetration adaptors 44 by a nut (not shown). An enclosure 46 mounted to the top of the penetration adaptors 44 sealingly separates this arrangement from the atmosphere. Additional details of the construction and assembly of the arrangement whereby the upper internals are connected to the closure head 42 may be found the copending application having the Ser. No. 53,207 and entitled "MEANS FOR RAPIDLY EXPOSING THE CORE OF A NUCLEAR REACTOR FOR REFUELING" filed July 8, 1970, by Erling Frisch et al and assigned to the present assignee, which is hereby incorporated by reference.

Figure 2:
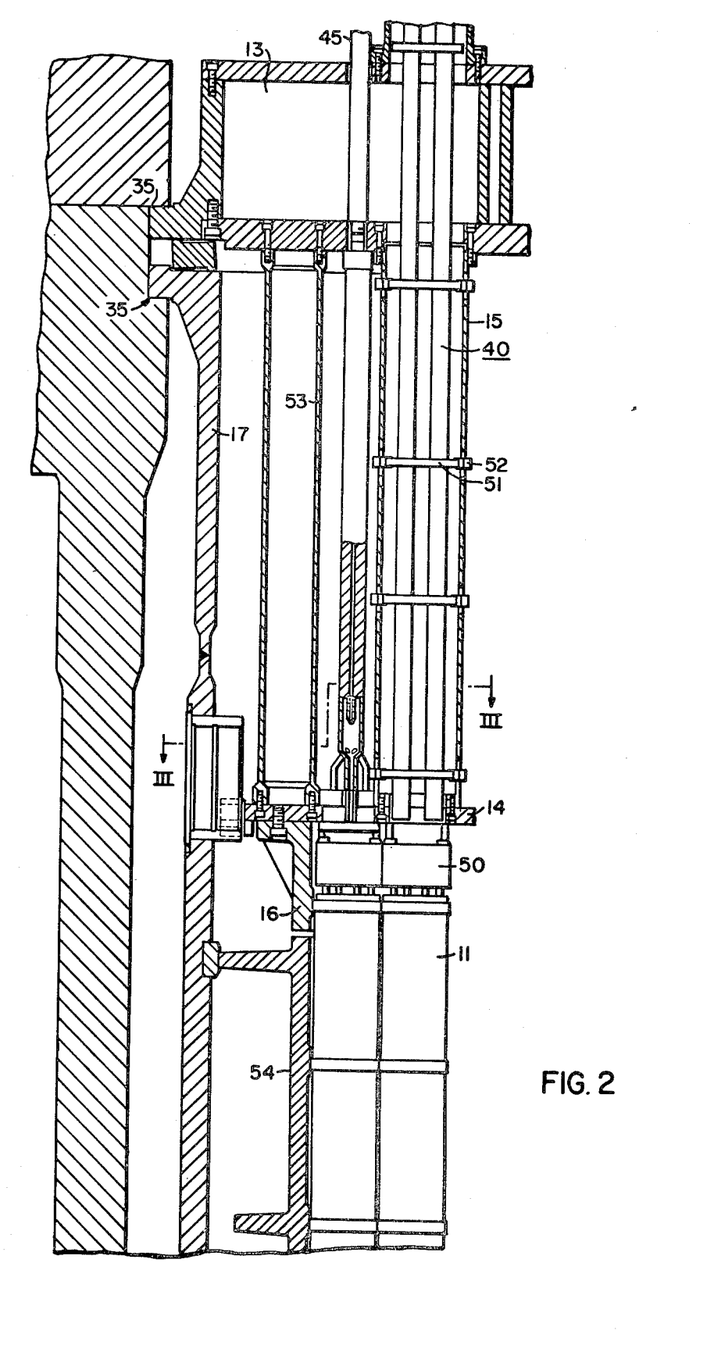
FIG. 2 is a cross sectional detailed view of the fitup of the upper internals with the lower internals, and additionally illustrating a method of locating a control rod guide tube assembly within a support column.
Figure 3:
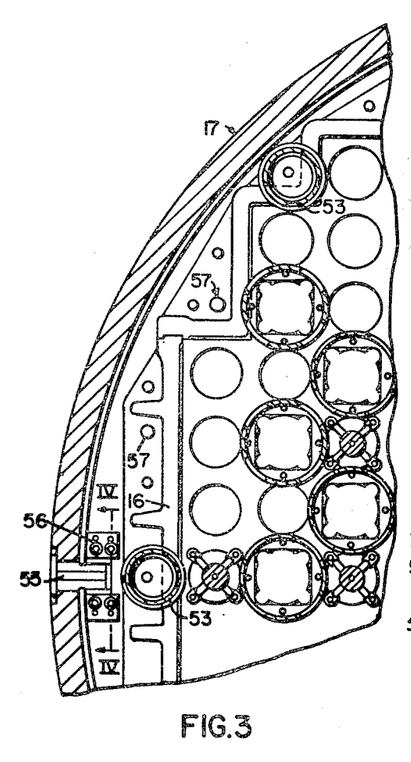
FIG. 3 is a cross sectional view taken substantially along the line III—III of FIG. 2.
Figure 4:
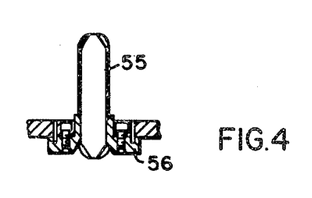
FIG. 4 illustrates in detail, an alignment key for axially positioning the upper internals with respect to the lower internals.

A number of exemplary details of the invention are illustrated in FIGS. 2, 3 and 4 to which attention is now directed. The relative strengths of the upper core plate 14 and the upper support structure 13 are readily discernible in these figures. The upper support structure 13 is the primary support member of the upper internals, while the upper core plate 14 serves primarily to align the upper end of the fuel assemblies 11. Nozzles 50 which are attached to the upper end of the fuel assemblies 11 comprise a fuel assembly exit nozzle which adjusts the flow of reactor coolant exiting therefrom. Support columns 15 are attached to the upper core plate 14 and the upper support structure 13 by conventional means such as by bolting. The control rod guide tube assembly 40 is supported with the support column 15 by support plates 51 which are keyed to the columns by members 52. Since effluent reactor coolant from fuel assembly 11 must flow past the control rod guide tube assembly 40 including plate members 51 within the support column 15, the cross sectional configuration of plate members 51 are shaped to offer minimum resistance to the upward coolant flow.

When the control rods 32 are in a fully withdrawn position above the core 10 and within the guide tube assemblies 40, the lower end of the control rods 32 extend through the top nozzle 50 into the upper portion of the fuel assembly 11. The length of the set-down skirt 16 is therefore made sufficiently long so as to extend below the lower limits of the control rods 32 when the latter are in a fully withdrawn position. In this manner, the ends of the control rods are protected from damage when the upper internals are lifted from the reactor vessel 12 as a single unit with the closure head 42 and the withdrawn control rods 32, and is set down on the skirt 16 in a temporary storage location. The weight load of the upper internals during this temporary storage is transmitted from the set-down skirt 16 into the upper support structure 13 through additional support columns known as set-down support tubes 53. These tubes are attached to the upper core plate 14 and the upper support structure 13 in a manner similar to the support columns 15, that is, by bolting.

Upon reassembly of the upper internals to a position within the reactor vessel 12, axial alignment of the upper core plate 14 relative to the core barrel 18, and the core baffle 54 attached thereto, is an absolute necessity. Alignment keys 55, shown in cross section in FIG. 4, spaced at 90° intervals around the periphery of the core barrel 18 are provided for this purpose. Keys 55 must be sufficiently long to make certain that the upper core plate 14 is properly aligned before set-down skirt 16 reaches the upper nozzles 50 of the fuel assemblies 11 so as to avoid any interference and to assure proper entrance of the control rods 32 in fuel assemblies 11. The slots in the upper core plate 14 which engage with the alignment keys 55 have hardened inserts. These prevent galling and permit accurate positioning of the slots relative to the upper core plate 14. Moreover, a converging entrance incorporated in the inserts allow minor adjustments to be made in the alignment between the upper and lower internals during reassembly.

The set-down skirt 16 is made of castings and comprised of several sections which conform to the general shape of the core baffle 54. It is attached to the upper core plate 14 by bolting and is precisely located therewith by means of two alignment pins 57 for each cast section.

Figure 5:
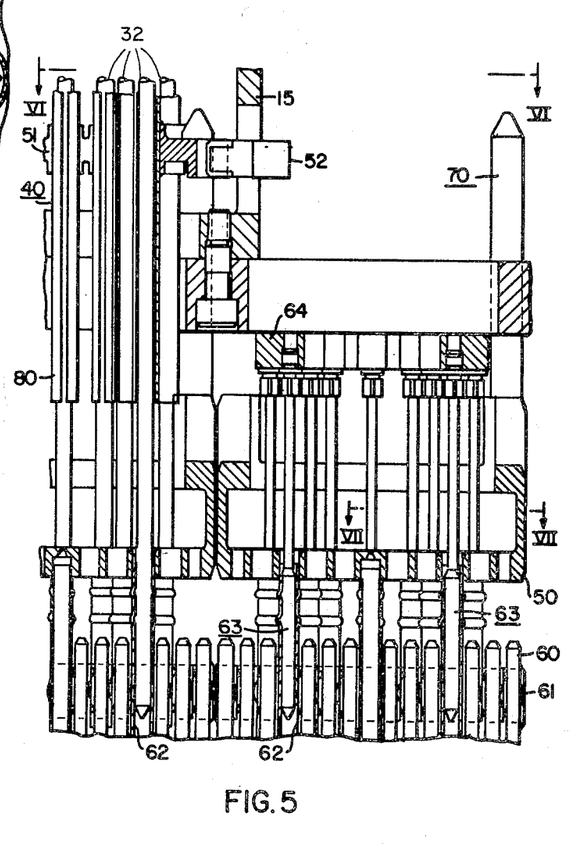
FIG. 5 illustrates additional details of the upper internals arrangement at a location of the fuel assembly outlet nozzles.
Figure 6:
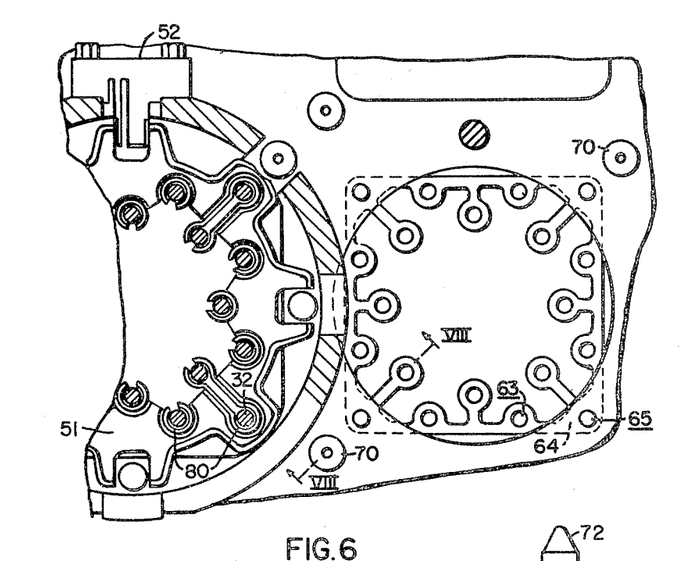
FIG. 6 is a cross sectional view taken substantially along the line VI—VI of FIG. 5.
Figure 7:
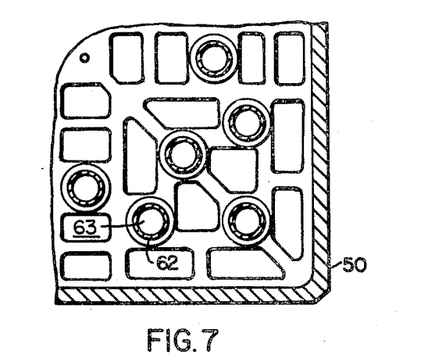
FIG. 7 is a cross sectional view taken along the line VII—VII of FIG. 5.

FIGS. 5, 6 and 7 illustrate additional details of the embodiment of the invention as applied to the example of the reactor shown. The illustrated fuel assemblies 11 comprise a relatively large number of closely spaced fuel rods 60 containing fissile material. A plurality of thin walled tubes or thimbles are fixedly attached to axially spaced grid members 61 and together comprise a frame into which the individual fuel rods 60 are placed. The thimbles 62 are individually attached to the top nozzle 50 by such means as welding. These thimbles 62 serve the additional purpose of guiding the control rod elements 32 during movement within the fuel assemblies 11. Although there are more fuel assemblies 11 than control rods 30 so that each fuel assembly is not necessarily associated with a control rod assembly, each fuel assembly 11 does include a plurality of thimbles 62 for structural rigidity. Hence, in this regard all fuel assemblies 11 are exactly the same. For reactor operation however, the unused thimbles 62 in fuel assemblies without control rods are plugged by means of thimble plugs 63.

Thimble plugs 63 are received by threaded holes in rack member 64 which is bolted to the upper core plate 14 by corner thimble plugs 65 in a manner illustrated in FIGS. 5 and 6. Accurate location of the thimble plugs 63 and 65 may be achieved by an alignment diameter 66 which fits closely within a hole 67 directly below threaded section 68. A close clearance, on the order of 0.015 to 0.020 inches, is provided between the thimble plugs 63 and the respective thimble 62 to limit reactor coolant flow which is bypass flow and therefore, undesirable through these unused thimbles 62 to an acceptable predetermined value. The thimbles plugs 63 and the corner thimble plug 65, are provided with a flexible mid-section 69 to allow binding thereby correcting for slight misalignment between the location of the thimble plugs and the respective fuel assembly 11. The lower end of the thimble plugs is tapered to facilitate entrance of the plug into its corresponding thimble. Since the thimble plugs 63 and 65 are mounted to the upper core plate 14, they are removed with the upper internals in preparation for reactor refueling; and, the set-down skirt 16 also serves to protect the thimble plugs from damage.

Figure 8:
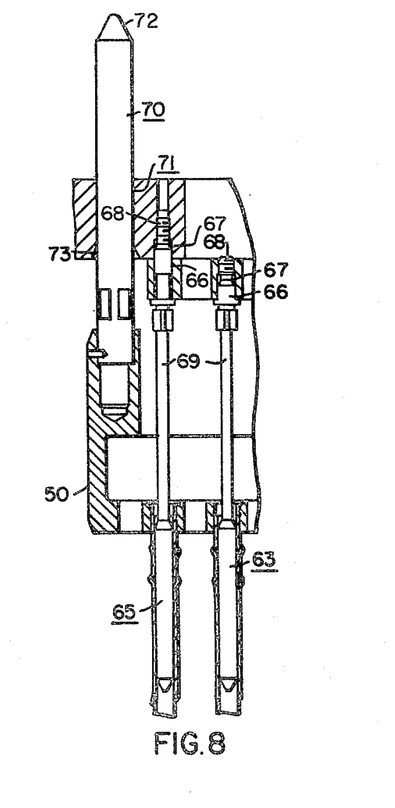
FIG. 8 is a cross sectional view of a method for orienting a fuel assembly with regard to the upper internals.

In FIGS. 5 and 8, it is seen that alignment pins 70 extend from opposite corners of the top nozzle 50 of each fuel assembly 11 into and through the upper core plate 14. These pins extend through extremely accurately located holes 71 in the upper core plate 14. Upon lowering of the upper internals during reassembly after reactor refueling, the alignment pins 70 serve to align laterally the upper ends of the fuel assemblies 11 which is essential for proper reactor operation. The tapered portion 72 of the alignment pin 70 and the tapered entrance 73 of the hole 71 in the upper core plate 14 coact to facilitate reassembly of the upper internals. In this regard, the length of alignment pin 71 is such that the fuel assemblies 11 are properly aligned with the upper internals prior to the thimble plugs 63 and 65 entering respective thimbles 62 within the fuel assemblies 11.

In the drawings, the control rod elements 32 are illustrated in a fully withdrawn position. Therefore, the lower ends of the control rod elements 32 are coextensive with the bottom ends of the thimble plugs 63 and 65 and the control rod elements 32 extend slightly into the upper ends of the fuel assemblies 11. The reason being similar to that given for the positioning of the thimble plugs 63 and 65 into the upper ends of the fuel assemblies 11. Here the ends of the control rod elements 32 prevent an unacceptable increase in reactor coolant bypass flow through thimbles 62 during full withdrawal of control rod 30.

As previously mentioned, a control rod guide tube assembly 40 is housed within support columns 15 having control rods associated therewith. The control rod guide tube assembly 40 includes a number of guide tubes 30 having a cross sectional configuration as shown in FIG. 6. Guide tubes 80 which guide the control rod elements 32 during control rod insertion and withdrawal operations are attached, such as by welding, to plate members 51. The plate members 51 are in turn fixedly connected to the support column 15 by shouldered spring pins 52. In the particular type of spring pin utilized, the necessary amount of resiliency is obtained by machining a slot through the pin along the length thereof. Spring pins 52 may be attached to support colums 15 by a conventional means such as bolting.

From the foregoing description, taken in connection with the drawings, it is seen that this invention provides an internals arrangement for a nuclear reactor adapted for rapid refueling. Withdrawn control rods are housed within guides which are located within support columns of the upper internals. By connecting the upper internals to the reactor closure head, the upper internals and the withdrawn control rods may be removed from the reactor vessel as a single unit thereby exposing the core for refueling.

Since numerous changes may be made in the above described apparatus and the different embodiments of the invention may be made without departing from the spirit and scope thereof, it is intended that all the matter contained in the foregoing description or shown in the accompanying drawings shall be interpreted as illustrative and not in a limiting sense.

We claim:

1. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core from the upper end thereof, and openings in a wall of said reactor vessel for ingress and egress of a reactor coolant flowing through said core, said support apparatus including an upper core support which is operatively connected to the upper end of said core, means for storing said control rods within said upper core support upon withdrawal of the control rods from the core, whereby upon removal of said upper core support, said withdrawn control rods being stored therein are also removed, thereby exposing said core, said upper core support including a downwardly extending peripheral open-ended skirt thereon which is located outwardly of and coextends with an upper portion of said core and receives said upper core portion through the open end of said skirt.

2. The nuclear reactor of claim 1, wherein said upper core support includes a pair of spaced plate members, a plurality of support columns interposed said plate members for transferring loads from one plate member to the other, some of said support columns having said control rod storage means positioned within the interior thereof and fixedly attached thereto for guiding said control rods upon being withdrawn from said core.

3. The nuclear reactor of claim 2, wherein each of said control rods comprise an array of elongated coextensive rods having neutron absorbing material therein, each of said rods being attached to a common hub by arms extending from said hub to each of said rods, and said guide and storage means within said support columns each include a plurality of elongated coextensive tubes, said tubes being supported along their length by a plurality of support plate members having a hole pattern corresponding with the pattern formed by said array of rods forming said control rod, said plate members being aligned with and fixedly connected to said support column by key members extending from said support columns to detents formed within said plate members.

4. The nuclear reactor of claim 1, wherein said upper core support includes a pair of spaced plate members, a plurality of support columns interposed said plate members for transferring loads from one plate member to the other, with some of said support columns being hollow and having said control rod storage means fixedly positioned therein, said storage means serving also to guide said control rods upon being withdrawn from said core, said storage and guide means having a length such that the lower end of a fully withdrawn control rod extends through one of said plate members and remains inserted a predetermined distance the upper end of said opening in said core so as to maintain a predetermined reactor coolant flow rate through said control rod opening in said core.

5. The nuclear reactor of claim 4, wherein said peripheral skirt of said upper core support is substantially cylindrical having a substantially annular cross sectional shape and is connected to the periphery of said plate member having said fully withdrawn control rod extending therethrough, said cylindrical member extending beyond the ends of said fully withdrawn control rods so as to protect the control rods from damage upon removal of said closure head, including said upper core support and said control rods as a unit whereby said unit may be set down on said skirt for storage during reactor refueling.

6. The nuclear reactor of claim 4, wherein said upper core support is mounted to said closure head and includes a substantially cylindrical member having a substantially annular cross sectional shape connected to the periphery of said plate member having said fully withdrawn control rod extending therethrough, said cylindrical member extending beyond the ends of said fully withdrawn control rods so as to protect the control rods from damage upon removal of said closure head, including said upper core support and said control rods as a unit, and said unit is set down on said cylindrical member of storage during reactor refueling.

7. The nuclear reactor of claim 1, wherein said core comprises a plurality of fuel assemblies, each fuel assembly including a plurality of elongated coextensive fuel rods and a plurality of elongated coextensive hollow rods, said fuel rods and said hollow rods being arranged in spatial relationship and being supported along the length thereof by a plurality of grid support members, said fuel assemblies each having a flow nozzle attached to the outlet end thereof, said fuel assemblies being connected by said flow nozzle to one of said plate members, at least some of said fuel assemblies within said core having control rods extending through said hollow rods, and some of said fuel assemblies within said core having plugs extending from within said hollow rods through said outlet nozzle to respective openings in said plate member.

8. The nuclear reactor of claim 7, wherein said fuel assemblies each include at least one aligning pin member attached to said outlet nozzle, said pin member extending through a hole in said plate member for aligning said fuel assembly with said upper core support, each of said aligning pin members and each of said holes having cooperating tapers such that entrance of said pin members into said respective holes is facilitated.

9. The nuclear reactor of claim 1, wherein said upper core support is mounted to said closure head, so that upon removal of said closure head, said upper core support is removed therewith.

10. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support which is operatively connected to the upper end of said core, means for storing said control rods within said upper core support upon withdrawal of the control rods from the core, whereby upon removal of said upper core support, said withdrawn control rods being stored therein are also removed, thereby exposing said core, each of said control rods comprises an array of elongated coextensive rods having neutron absorbing material therein, each of said rods being attached to a common hub by arms extending from said hub to each of said rods, and said guide and storage means within said support columns each including a plurality of elongated coextensive tubes, said tubes being supported along their length by a plurality of support plate members having a hole pattern corresponding with the pattern formed by said array of rods forming said control rod, said plate members being aligned with and fixedly connected to said support column by key members extending from said support columns to detents formed within said plate members each of said key members having a T-shaped configuration, said key member having a slot formed therethrough and along the length thereof so as to be resilient in a direction transverse to said slot.

11. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support which is operatively connected to the upper end of said core, means for storing said control rods within said upper core support upon withdrawal of the control rods from the core, whereby upon removal of said upper core support, said withdrawn control rods being stored therein are also removed, thereby exposing said core, said upper core support including a downwardly extending peripheral open-ended skirt thereon which is located outwardly of and coextends with an upper portion of said core and receives said upper core portion through the open end of said skirt, said core support apparatus including a plurality of elongated alignment key members connected to said core support apparatus, and said upper core support including a plurality of alignment slots formed within said upper core support, each of said alignment slots being engaged by a respective alignment key member so as to align said upper core support with said core support apparatus.

12. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support having a lower transverse plate member which is operatively connected to the upper end of said core, means for storing said control rods within said upper core support upon withdrawal of the control rods from the core, whereby upon removal of said upper core support, said withdrawn control rods being stored therein are also removed, thereby exposing said core, said core comprising a plurality of fuel assemblies, each fuel assembly including a plurality of elongated coextensive fuel rods and a plurality of elongated coextensive hollow rods, said fuel rods and said hollow rods being arranged in spatial relationship and being supported along the length thereof by a plurality of grid support members, said fuel assemblies each having a flow nozzle attached to the outlet end thereof, said fuel assemblies being connected by said flow nozzle to said plate member, at least some of said fuel assemblies within said core having control rods extending through said hollow rods, and some of said fuel assemblies within said core having plugs extending from within said hollow rods through said outlet nozzle to respective openings in said plate member, said plugs fitting within said hollow rods of each of said some fuel assemblies being connected to a rack member, said rack member being connected to said plate member of said upper core support.

13. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support which is operatively connected to the upper end of said core, means for storing said control rods within said upper core support upon withdrawal of the control rods from the core, whereby upon removal of said upper core support, said withdrawn control rods being stored therein are also removed, thereby exposing said core, said upper core support being mounted to said closure head, so that upon removal of said closure head, said upper core support is removed therewith, said upper core support including a downwardly extending peripheral open-ended skirt thereon which is located outwardly of and coextends with an upper portion of said core and receives said upper core portion through the open end of said skirt, and said core support apparatus including a plurality of elongated alignment key members connected to said core support apparatus, said upper core support includes a plurality of alignment slots formed within said upper core support, each of said alignment slots being engaged by a respective alignment key member so as to align said upper core support with said core support apparatus.

14. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support which is operatively connected to the upper end of said core, means for storing said control rods within said upper core support upon withdrawal of the control rods from the core, whereby upon removal of said upper core support, said withdrawn control rods being stored therein are also removed, thereby exposing said core, said upper core support including a downwardly extending peripheral open-ended skirt thereon which is located outwardly of and coextends with an upper portion of said core and receives said upper core portion through the open end of said skirt, alignment key means and alignment slot means for aligning said upper core support with said core support apparatus, one of said alignment key means and alignment slot means being located on said upper core support and the other being located on said core support apparatus, said alignment key means being received within said alignment slot means when said upper core support and said core support apparatus are in alignment.

15. In a nuclear reactor, a reactor vessel having a removable closure head, a core containing nuclear fuel positioned within said reactor vessel, support apparatus for structurally supporting said core within said reactor vessel, a plurality of control rods for controlling the operation of said reactor, said control rods being mounted to said closure head for movement into and out of said core, and openings in a wall of said reactor vessel for ingress and egress of a reactor coolant flowing through said core, said support apparatus including an upper core support which is operatively connected to the upper end of said core, said upper core support including a downwardly extending peripheral open-ended skirt thereon which is located outwardly of and coextends with an upper portion of said core and receives said upper core portion through the open end of said skirt, alignment key means and alignment slot means for aligning said upper core support with said core support apparatus, one of said alignment key means and alignment slot means being located on said upper core support and the other being located on said core support apparatus, said alignment key means being received within said alignment slot means when said upper core support and said core support apparatus are in alignment.

16. The nuclear reactor of claim 15 wherein said upper core support is mounted to said closure head, so that upon removal of said closure head, said upper core support is removed therewith.

\* \* \* \* \*